United States Patent
Shumate et al.

(10) Patent No.: US 7,278,608 B2
(45) Date of Patent: *Oct. 9, 2007

(54) REINFORCED INSULATION PRODUCT AND SYSTEM SUITABLE FOR USE IN AN AIRCRAFT

(75) Inventors: Monroe William Shumate, Littleton, CO (US); James W. Stacy, Peyton, CO (US)

(73) Assignee: Johns Manville, Denver, CO (US)

( * ) Notice: Subject to any disclaimer, the term of this patent is extended or adjusted under 35 U.S.C. 154(b) by 126 days.

This patent is subject to a terminal disclaimer.

(21) Appl. No.: 11/167,864

(22) Filed: Jun. 27, 2005

(65) Prior Publication Data

US 2007/0003734 A1    Jan. 4, 2007

(51) Int. Cl.
*B64C 1/00* (2006.01)

(52) U.S. Cl. ................................. 244/129.1

(58) Field of Classification Search ............ 244/117 R, 244/118.5, 119, 121, 125, 129.1, 129.2, 131; 428/126
See application file for complete search history.

(56) References Cited

U.S. PATENT DOCUMENTS

| | | | | |
|---|---|---|---|---|
| 2,028,253 | A * | 1/1936 | Spafford | 428/126 |
| 2,050,074 | A * | 8/1936 | Trytten | 52/783.11 |
| 2,050,512 | A * | 8/1936 | Trytten | 29/458 |
| 2,095,626 | A * | 10/1937 | Bassett et al. | 52/275 |
| 2,302,949 | A * | 11/1942 | Palmer | 52/588.1 |
| 2,342,839 | A * | 2/1944 | Byers | 428/126 |
| 2,409,951 | A * | 10/1946 | Nootens | 52/404.5 |
| 2,911,605 | A * | 11/1959 | Wales, Jr. | 336/200 |
| 3,077,947 | A * | 2/1963 | Peebles et al. | 442/229 |
| 3,317,657 | A * | 5/1967 | Eisler | 174/117 FF |
| 3,435,581 | A * | 4/1969 | Ahlqvist | 52/405.1 |
| 3,483,358 | A * | 12/1969 | Eisler | 219/385 |
| 3,567,162 | A * | 3/1971 | Lea | 244/121 |
| 4,001,996 | A * | 1/1977 | Byrd, Jr. | 52/509 |
| 4,406,914 | A * | 9/1983 | Kincaid | 174/107 |
| 4,605,583 | A * | 8/1986 | Frahme | 428/126 |
| 5,032,447 | A * | 7/1991 | Bailey | 428/184 |
| 5,154,373 | A * | 10/1992 | Scott | 244/117 R |
| 5,506,020 | A * | 4/1996 | Haberkorn | 428/102 |
| 5,577,688 | A * | 11/1996 | Sloan | 244/117 R |
| 5,759,663 | A * | 6/1998 | Hounsel | 428/99 |
| 5,882,765 | A * | 3/1999 | Pastureau et al. | 428/102 |
| 6,358,591 | B1 * | 3/2002 | Smith | 428/74 |
| 6,844,057 | B2 * | 1/2005 | DiChiara, Jr. | 428/326 |
| 6,844,091 | B2 * | 1/2005 | Denham et al. | 428/697 |
| 6,866,733 | B1 * | 3/2005 | Denham et al. | 156/89.11 |
| 7,083,147 | B2 * | 8/2006 | Movsesian et al. | 244/121 |
| 2001/0040793 | A1 | 11/2001 | Inaba | 361/749 |
| 2004/0055227 | A1* | 3/2004 | Allwein et al. | 52/98 |
| 2004/0180592 | A1* | 9/2004 | Ray | 442/38 |
| 2005/0211839 | A1* | 9/2005 | Movsesian et al. | 244/119 |
| 2006/0284014 | A1* | 12/2006 | Muller et al. | 244/119 |
| 2007/0045469 | A1* | 3/2007 | Shumate et al. | 244/129.1 |

* cited by examiner

*Primary Examiner*—Stephen Holzen
(74) *Attorney, Agent, or Firm*—Robert D. Touslee

(57) ABSTRACT

An acoustical and thermal insulation product suitable for use in an aircraft is provided, comprising: an insulation layer formed from at least one sheet of insulation material, and a plurality of elongated reinforcing members for reinforcing the insulation product, wherein the plurality of elongated reinforcing members comprises fiber glass and a resin.

22 Claims, 2 Drawing Sheets

REINFORCED INSULATION PRODUCT AND SYSTEM SUITABLE FOR USE IN AN AIRCRAFT

BACKGROUND

An insulation product can be installed in various structures such as the fuselage of an aircraft. Such insulation products for installation in an aircraft typically provide a barrier to the high sound levels and/or cold temperatures encountered during flight.

The use of conventional aircraft insulation products can present several disadvantages. For example, the formation and installation of conventional insulation products can be relatively expensive. In addition, conventional insulation products can provide an inadequate amount of thermal and/or acoustical insulation, and the structural characteristics of such products can be insufficient.

SUMMARY

According to one aspect, an acoustical and thermal insulation product suitable for use in an aircraft is provided, comprising: an insulation layer formed from at least one sheet of insulation material, and a plurality of elongated reinforcing members for reinforcing the insulation product, wherein the plurality of elongated reinforcing members comprises fiber glass and a resin.

According to another aspect, an insulation system suitable for installation in an aircraft fuselage is provided, comprising:

an acoustical and thermal insulation product comprising an insulation layer formed from at least one sheet of insulation material, and a plurality of elongated reinforcing members for reinforcing the insulation product, wherein the plurality of elongated reinforcing members comprises fiber glass and a resin; and a plurality of securing members for securing the insulation product to the aircraft fuselage, wherein each securing member is capable of engagement with a structural element of the aircraft fuselage.

DETAILED DESCRIPTION

The insulation product can be used to provide acoustical and thermal insulation to a surface or a structure to be insulated. For example, the insulation product can be installed in a space, cavity or void present in an aircraft such as in the fuselage of an aircraft. The insulation product can be particularly useful for insulating a space, cavity or void defined by support structures in the fuselage, for example, the space, cavity or void defined by adjacent fuselage ribs. As used herein, the terms "space", "cavity" and "void" are used to describe a volume or an area in which the insulation product can be installed, and such terms are used interchangeably.

Figure 1:
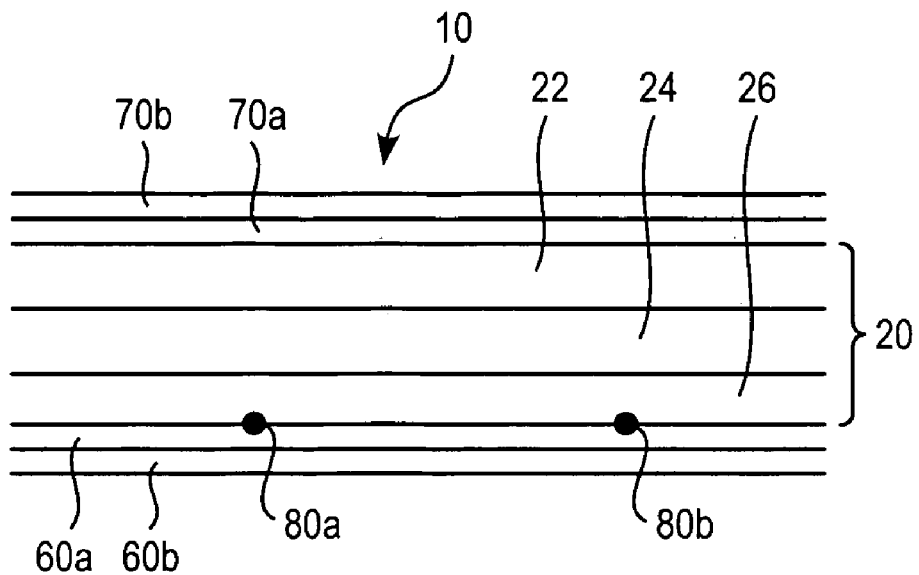
FIG. 1 is a cross-sectional view of an exemplary insulation product.

Referring to FIG. 1, the insulation product 10 includes an insulation layer 20. The insulation layer 20 can be formed from at least one sheet of insulation material, preferably a plurality of sheets of insulation material arranged in a stacked formation. For example, two or three sheets of insulation material can be arranged in a stacked formation to form the insulation layer 20. FIG. 1 shows an exemplary embodiment in which first, second and third sheets of insulation material 22, 24, 26 are arranged in a stacked formation to form the insulation layer 20. The first, second and third sheets 22, 24, 26 can be attached together by applying adhesive to at least a portion of a surface of the sheets. For example, an adhesive can be applied to either the lower surface of the first sheet 22 or the upper surface of the second sheet 24, and either the lower surface of the second sheet 24 or the upper surface of the third sheet 26. For example, the adhesive can be a double-sided tape and/or a binder. The binder can include, for example, phenolic, acrylic, latex or mixtures thereof. The adhesive can be flame-retardant and/or pressure sensitive. Any suitable method for employing the adhesive can be used. For example, an adhesive can be applied to at least a portion of one or both sides of each sheet of insulation material.

Figure 2:
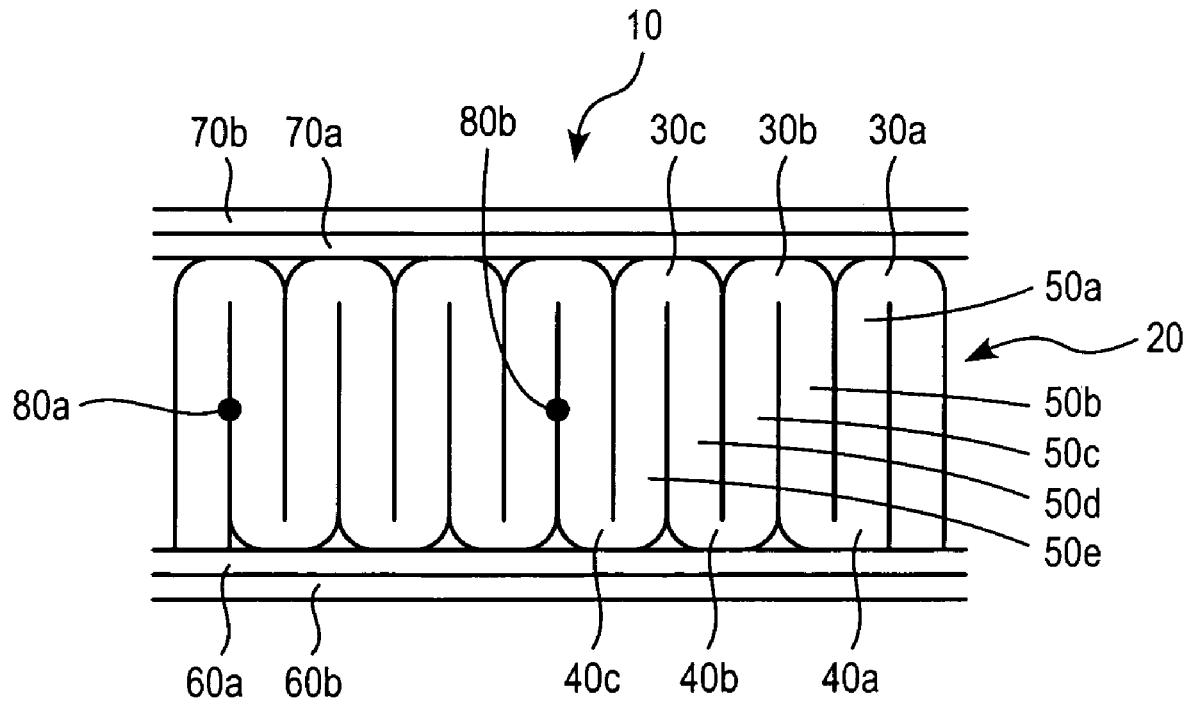
FIG. 2 is a cross-sectional view of another exemplary insulation product.

Referring to FIG. 2, in an alternative embodiment, the insulation layer 20 can be formed from at least one sheet of insulation material arranged to form a series of undulations defining a series of alternating upper ridges 30a, 30b, 30c and lower ridges 40a, 40b, 40c. For example, the series of undulations can be formed by folding the sheet of insulation material back and forth a plurality of times such that the segments of the sheet that are present between the folds overlap each other. The segments of the sheet can be arranged adjacent to one another, thus forming the insulation layer 20. For example, by folding the sheet so as to maintain substantially uniform dimensions of the segments, an insulation layer 20 that has a substantially uniform thickness can be formed.

In this embodiment, the number of undulations formed in the sheet of insulation material can depend on the particular application of the insulation product 10 and/or the desired structural characteristics of the insulation product 10. For example, from about 7 to about 20 upper ridges can be present per foot along the lengthwise direction of the insulation layer 20, more preferably from about 8 to about 12 upper ridges per foot along the lengthwise direction of the insulation layer 20. For simplicity, three upper ridges 30a, 30b, 30c and three lower ridges 40a, 40b, 40c are labeled in FIG. 2, however, the insulation layer 20 can be formed to contain any suitable number of upper and lower ridges. While not wishing to be bound by any particular theory, it is believed that employing the insulation layer 20 formed from the sheet arranged to have a series of undulations as described above can, for example, improve the resistance of the insulation layer 20 to compression in the thickness dimension and/or improve the overall stiffness of the insulation product 10.

The upper ridges 30a, 30b, 30c can define the upper surface of the insulation layer 20, and the lower ridges 40a, 40b, 40c can define the lower surface of the insulation layer 20. As used herein, the term "ridge" used to describe a structural feature of the undulations, can include a structure that has substantially curved portions and/or substantially flat portions. For example, depending on the particular shape of the upper and lower ridges, the upper and lower surfaces of the insulation layer 20, for example, can have a substantially jagged or substantially flat cross-sectional profile. For example, the upper ridges 30a, parallel to each other, and the lower ridges 40a, 40b, 40c can be substantially parallel to each other.

Referring to FIG. 2, the series of undulations of the sheet of insulation material defines a series of elongated segments 50a to 50e of the sheet. The elongated segments 50a to 50e are located between the upper ridges 30a, 30b, 30c and lower ridges 40a, 40b, 40c. In FIG. 2, five elongated segments 50a to 50e are labeled for simplicity, however, any suitable number of elongated segments can be employed. For example, each elongated segment 50a to 50e can be in contact with at least one adjacent elongated segment, preferably, both adjacent elongated segments. As used herein, the term "in contact with" refers to an arrangement in which an elongated segment is in direct contact with an adjacent elongated segment, and/or is in indirect contact with an adjacent elongated segment (but is in close proximity to such segment) via an intermediate substance such as an adhesive. As used herein, the term "adjacent elongated segment" refers to an elongated segment that is immediately located to either side of the elongated segment in question, in the series of elongated segments.

At least one of the elongated segments can be attached to an adjacent elongated segment by any suitable means. In an exemplary embodiment, each elongated segment can be attached to at least one adjacent elongated segment, preferably both adjacent elongated segments. Adjacent elongated segments can be attached to be in direct contact with each other, and/or in indirect contact with each other via an intermediate substance therebetween such as an adhesive. For example, an adhesive can be applied to at least one elongated segment which enables such segment to be securely attached to an adjacent elongated segment. The adhesive that can be used in this embodiment is not particularly limited and, for example, the adhesives described above with respect to the embodiment shown in FIG. 1, can be used.

Any suitable method for employing the adhesive can be used. For example, the adhesive can be applied to at least a portion of one or both sides of the sheet of insulation material. The adhesive can be applied to the sheet, for example, prior to, during or after the formation of the series of undulations, and preferably prior to or during the formation of the series of undulations.

Referring to FIG. 2, the insulation layer 20 can be formed from a single sheet of insulation material in the manner described above, or from a plurality of sheets of insulation material. For example, an elongated segment at an end of a first sheet of insulation material can engage with an elongated segment at an end of a second sheet of insulation material. For example, such elongated segments of the first and second sheets can be folded over each other. In this manner, the series of undulations of the insulation layer 20 can be continued in a substantially continuous manner using multiple sheets of insulation material.

The overall dimensions of the insulation product 10 can depend on the particular application of the insulation product 10, for example, the size of the space, cavity or void that is to be insulated. The insulation product 10 can be provided in the form of relatively short, separate sheets and/or relatively long rolls. For example, when the insulation product 10 is used to insulate a space in a fuselage of an aircraft, the insulation product 10 can have a width of from about 0.5 to about 4 feet, and a length of from about 0.5 to about 25 feet. In an exemplary embodiment, the insulation product can be formed into a size that is slightly larger in at least one dimension in comparison with the space to be insulated, to enable a compression fit of the insulation product 10 in such space.

The thickness of the insulation layer 20 can depend on the particular application of the insulation product 10, for example, the dimensions and location of the space in which the insulation product is to be installed, and/or the required specification of the insulation product 10. For example, the insulation layer 20 can have a thickness of from about 1 to about 10 inches, more preferably from about 1 to about 4 inches, and more preferably from about 2 to about 4 inches. As used herein, the term "thickness" as it relates to the thickness of the insulation layer 20 refers to the thickness of the insulation layer 20 prior to installation of the insulation product 10. The thickness of the insulation layer 20 can be controlled, for example, by controlling the height of the series of elongated segments 50a to 50e. For example, an insulation layer 20 having a substantially constant thickness can be formed by forming undulations in which the elongated segments have a consistent height. Alternatively, by varying the height of the series of elongated segments, an insulation layer 20 having a varying thickness can be formed.

In the exemplary embodiments shown in either of FIGS. 1 or 2, the sheet or plurality of sheets of insulation material used to form the insulation layer 20 can provide acoustical and thermal insulation. For example, the sheet of insulation material can be formed from glass fibers and/or a flexible foam such as a plastic foam. The flexible foam can be formed from any suitable material such as, for example, a polyimide, a phenolic, a melamine or mixtures thereof. In an exemplary embodiment, an insulation material formed from resin-bonded borosilicate biosoluble glass fibers such as Microlite(R) AA Premium NR insulation material available from Johns Manville located in Littleton, Colo., can be used. The sheet of insulation material can have a flexible structure which enables the sheet to be arranged to form a series of undulations as described above. Preferably, the sheet is sufficiently flexible so as to enable the insulation product 10 formed therefrom to flex and adjust its shape to fit into various spaces.

The sheet of insulation material can have dimensions, for example, which enable the sheet to be arranged to form a series of undulations as described above. For example, the sheet of insulation material can have a thickness of from about 0.25 to about 3 inches, preferably from about 0.5 inches to about 2 inches. The sheet of insulation material can have a density which enables the insulation product to be suitable for installation in an aircraft. For example, the sheet of insulation material can have a density of from about 0.3 to about 2 PCF, preferably from about 0.3 to about 0.6 PCF. The length and/or width of the sheet of insulation material can depend on the dimensions of the space to be insulated. For example, in aircraft fuselage insulation applications, the length and/or width of the sheet of insulation material can depend on at least the dimensions of the space defined by adjacent fuselage ribs of the aircraft.

Referring to FIGS. 1 and 2, the insulation product 10 can include at least one lower layer 60a and/or at least one upper layer 70a. For example, the at least one lower layer 60a and at least one upper layer 70a can provide structural reinforcement to the insulation layer 20. For example, the lower and upper layers 60a and 70a can help to maintain the folded arrangement of the insulation sheet, and/or to increase the rigidity of the insulation product 10. The at least one lower layer 60a and at least one upper layer 70a can be formed from any material suitable for providing structural reinforcement. Preferably, the at least one lower layer 60*a* and at least one upper layer 70*a* can be formed from a material that is flexible to enable the product 10 to be installed in spaces with curved surfaces such as a fuselage of an aircraft. For example, the at least one lower layer 60*a* and at least one upper layer 70*a* can be formed from a polyvinylfluoride (PVF), a polyimide (PI), a polyester or mixtures thereof. In an exemplary embodiment, the insulation product 10 can include two lower layers 60*a* and 60*b* and/or two upper layers 70*a* and 70*b*. Each lower and/or upper layer can have a thickness of, for example, from about 0.25 mil to about 6 mil.

The at least one lower layer 60*a* can be attached to the lower surface of the insulation layer 20, and the at least one upper layer 70*a* can be attached to the upper surface of the insulation layer 20. The at least one lower layer 60*a* and at least one upper layer 70*a* can be attached to the insulation layer 20 by using any suitable means. For example, an adhesive such as a pressure sensitive adhesive and/or a contact adhesive can be used. In an exemplary embodiment, a resin can be used such as a phenolic, an acrylic, a latex or mixtures thereof. The adhesive that can be used is not particularly limited.

Referring to FIGS. 1 and 2, the insulation product 10 can include a plurality of elongated reinforcing members 80*a*, 80*b* to provide structural reinforcement to the insulation product 10. The plurality of elongated reinforcing members 80*a*, 80*b* can be arranged in the product 10 at locations which enable such reinforcing members 80*a*, 80*b* to provide structural reinforcement to the insulation product 10. For example, referring to FIG. 1, the plurality of elongated reinforcing members 80*a*, 80*b* can be arranged on the upper and/or lower surface of the insulation layer 20. Additionally or alternatively, the reinforcing members can be arranged inbetween the sheets of insulating material.

Referring to FIG. 2, the plurality of elongated reinforcing members 80*a*, 80*b* can be arranged between the elongated segments of the insulation layer 20, as shown in FIG. 2. The plurality of elongated reinforcing members 80*a*, 80*b* can be arranged in the product at locations which enable such reinforcing members 80*a*, 80*b* to provide structural reinforcement to the insulation product 10. For example, the plurality of elongated reinforcing members 80*a*, 80*b* can be arranged between the elongated segments of the insulation layer 20, as shown in FIG. 2. In this arrangement, the elongated reinforcing members 80*a*, 80*b* can extend in a direction that is substantially parallel to the plurality of upper and lower ridges. In an exemplary embodiment, the elongated reinforcing members 80*a*, 80*b* can be arranged proximate to the folds of the sheet of insulation material (not shown).

Additionally or alternatively, a plurality of elongated reinforcing members can be arranged on or above the upper and/or lower surface of the insulation layer 20. For example, the plurality of elongated reinforcing members can be arranged between the insulation layer 20 and the upper layer 70*a* and/or between the insulation layer 20 and the lower layer 60*a*. Additionally or alternatively, a plurality of elongated reinforcing members can be attached to the exterior of the at least one lower layer 60*a* or 60*b* and/or the at least one upper layer 70*a* or 70*b*.

An adhesive can be used to attach the plurality of elongated reinforcing members to the insulation layer 20. The adhesive that can be used is not particularly limited. For example, a pressure sensitive adhesive and/or a contact adhesive can be used. In an exemplary embodiment, a resin can be used such as a phenolic, an acrylic, a latex or mixtures thereof.

In an exemplary embodiment in which the insulation product 10 is installed in a space defined at least in part by a curved surface such as a surface of a fuselage of an aircraft, the plurality of elongated reinforcing members can be arranged such that they do not substantially bend. For example, the plurality of elongated reinforcing members can be slightly longer than the space in which the insulation product is to be installed in order to form a compression fit in such space.

The plurality of elongated reinforcing members can have any elongated structure such as, for example, a rod-like or wire-like structure. The cross-sectional profile of each elongated reinforcing member is not particularly limited, and can be, for example, circular, elliptical or polygonal. The thickness of each elongated reinforcing member can be less than about 1 inch, preferably less than about 0.5 inch, more preferably from about 1/16 inch to about 3/8 inch.

The plurality of elongated reinforcing members can be formed from any material suitable for imparting structural reinforcement to the insulation material 10 such as, for example, glass fiber, metal, carbon (such as graphite), plastic and combinations thereof. Examples of metals that can be used are steel, titanium, aluminum, and mixtures thereof. In an exemplary embodiment, the plurality of elongated reinforced members can be formed from at least glass fibers and a resin. Any resin can be used that is compatible with the glass fibers, and that is capable of forming the elongated reinforcing members having the characteristics described above, when used in conjunction with the glass fibers. The resin can include a phenolic resin, a polyimide resin, an epoxy resin, an acrylic resin or mixtures thereof.

The plurality of elongated reinforcing members can be oriented substantially parallel or substantially perpendicular to the direction of propagation of the upper and/or lower ridges of the insulation layer 20, preferably parallel to the direction of propagation of the upper and lower ridges. For example, the plurality of elongated reinforcing members can be arranged a predetermined distance apart from each other, for example, from about 0.5 to about 12 inches apart from each other, preferably from about 4 to about 6 inches apart from each other. The plurality of elongated reinforcing members can extend partially or completely from one end of the insulation product 10 to the opposite end of the insulation product 10.

Figure 3:
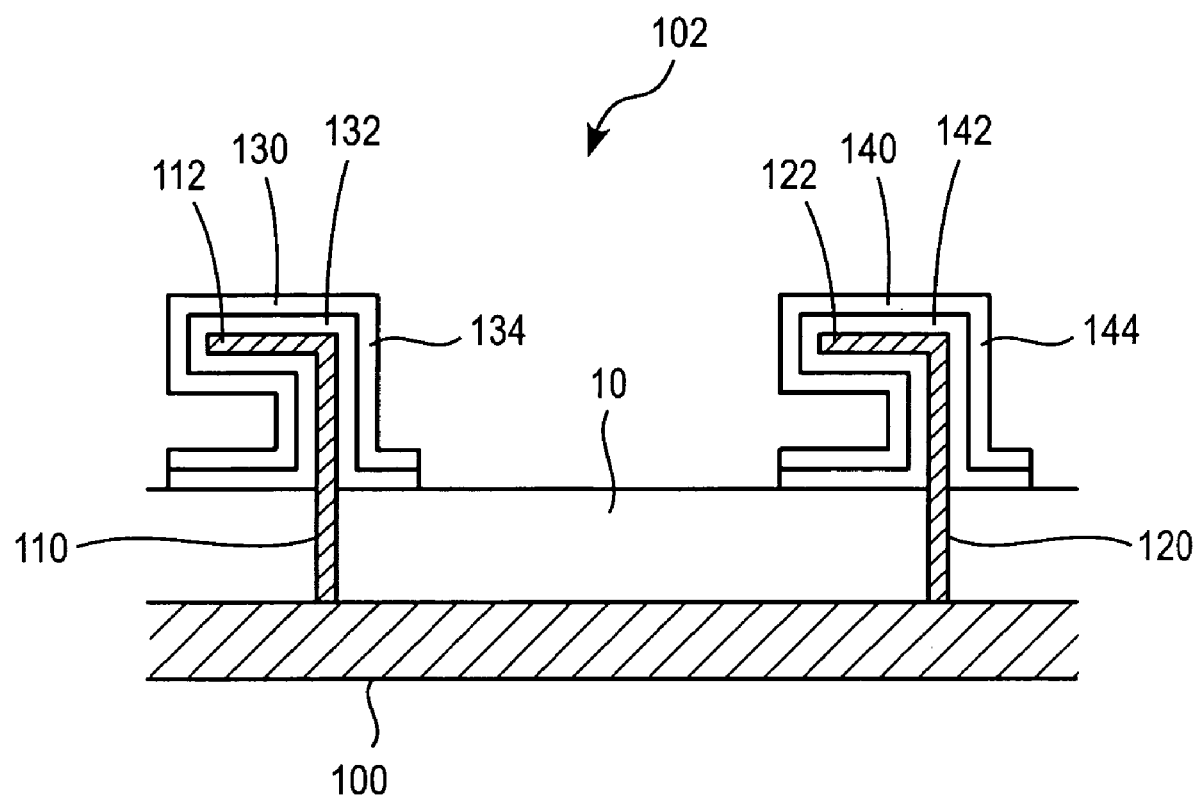
FIG. 3 is a cross-sectional view of an exemplary insulation product and system installed in a cavity of a fuselage of an aircraft.

Referring to FIG. 3, the insulation product 10 can be used, for example, to insulate a surface of the fuselage 100 of an aircraft. The insulation product 10 can be used to insulate any void or cavity of an aircraft, for example, a space defined by structural elements of the fuselage such as fuselage ribs 110 and 120. For example, the insulation product 10 can be arranged in the space defined by the fuselage 100 and adjacent fuselage ribs 110 and 120. The insulation product 10 can have dimensions which enable such insulation product 10 to form a compression fit in the space defined by the fuselage 100 and adjacent fuselage ribs 110 and 120.

Also provided is an insulation system suitable for installation in an aircraft fuselage. For example, referring to FIG. 3, the insulation system 102 can include at least one securing member and preferably a plurality of securing members 130 and 140 that can be used to secure the position of the insulation product 10. The plurality of securing members 130 and 140 can removably engage structural elements of the fuselage of the aircraft, for example, fuselage rib structures 110 and 120. For example, the insulation product 100 can be formed of a thickness such that the rib structures 110 and 120 extend past the upper surface of the insulation product 10. A plurality of securing members 130 and 140 can be removably engaged with the fuselage rib structures 110 and 120, for example, to reduce or prevent the occurrence of the insulation product 10 being dislodged from the space defined by the fuselage 100 and the adjacent fuselage rib structures 110 and 120.

The plurality of securing members 130 and 140 can be formed from at least one insulation material such as, for example, an insulation material formed from resin-bonded borosilicate biosoluble glass fibers such as Microlite(R) AA Premium NR insulation material available from Johns Manville located in Littleton, Colo. For example, the plurality of securing members 130 and 140 can include an inner layer 132, 142 and an outer layer 134, 144. In an exemplary embodiment, the inner layer 132, 142 can be formed from a material that is more rigid than the material forming the outer layer 134, 144. For example, the inner layer 132, 142 can be formed from standard wool and/or moldable glass wool (MGW). The outer layer 134, 144 of the securing members can be formed from, for example, Microlite(R) AA Premium NR insulation material and/or a flexible foam formed from any suitable material such as, for example, a polyimide, a phenolic, a melamine or mixtures thereof.

The plurality of securing members 130 and 140 can be formed into a shape that enables such securing members 130 and 140 to be removably engaged with structural elements of the fuselage of the aircraft, for example, fuselage rib structures 110 and 120. For example, the plurality of securing members 130 and 140 can each have a cavity for engaging a structural element of the fuselage of the aircraft. Preferably, the cavity can form a compression fit with the structural element of the fuselage of the aircraft. As shown in FIG. 3, the fuselage rib structures 110 and 120 can have angled tip portions 112 and 122 which extend at an angle from the base of the rib structures 110 and 120. The angled tip portions 112 and 122 can, for example, extend at substantially a 90 degree angle from the base of the rib structures 110 and 120. The cavities of the securing members 130 and 140 can be formed to accommodate such angled tip portions 112 and 122, and preferably to form a compression fit with such angled tip portions 112 and 122. For example, the cavities of the securing members 130 and 140 can be formed to have an angle of greater than or less than 90 degrees to form the compression fit.

While the invention has been described in detail with reference to specific embodiments thereof, it will be apparent to one skilled in the art that various changes and modifications can be made, and equivalents employed without departing from the scope of the claims.

What is claimed is:

1. An acoustical and thermal insulation product suitable for use in an aircraft, comprising:

an insulation layer formed from at least one sheet of insulation material, wherein the sheet of insulation material is arranged to form a series of undulations defining a series of alternating upper ridges and lower ridges of the sheet, wherein the series of undulations defines a series of elongated segments of the sheet located between the upper ridges and the lower ridges, and wherein at least one of the elongated segments is attached to an adjacent elongated segment by an adhesive, and a plurality of elongated reinforcing members for reinforcing the insulation product, wherein the plurality of elongated reinforcing members comprises fiber glass and a resin.

2. The insulation product of claim 1, wherein the insulation layer is formed from a plurality of sheets of insulation material.

3. The insulation product of claim 1, wherein each elongated segment is in contact with at least one adjacent elongated segment.

4. The insulation product of claim 3, wherein the elongated segments are substantially parallel to each other.

5. The insulation product of claim 3, wherein each elongated reinforcing member is arranged between two adjacent elongated segments.

6. The insulation product of claim 1, further comprising at least one upper layer arranged above the insulation layer at least one lower layer arranged below the insulation layer.

7. The insulation product of claim 6, wherein the plurality of elongated reinforcing members is arranged between the insulation layer and the at least one upper layer and/or between the insulation layer and the at least one lower layer.

8. The insulation product of claim 1, further comprising at least one upper layer arranged above the insulation layer and at least one lower layer arranged below the insulation layer.

9. The insulation product of claim 1, wherein the insulation layer has a thickness of from about 1 to about 4 inches.

10. The insulation product of claim 1, wherein the sheet of insulation material is formed from fiber glass or a plastic foam.

11. The insulation product of claim 1, wherein the insulation layer has from about 7 to about 20 upper ridges per foot, based on the length of the insulation layer.

12. The insulation product of claim 1, wherein the plurality of elongated reinforcing members is in contact with the insulation layer.

13. An insulation system suitable for installation in an aircraft fuselage, comprising:

an acoustical and thermal insulation product comprising:

an insulation layer formed from at least one sheet of insulation material, wherein the sheet of insulation material is arranged to form a series of undulations defining a series of alternating upper ridges and lower ridges of the sheet, wherein the series of undulations defines a series of elongated segments of the sheet located between the upper ridges and the lower ridges, and wherein at least one of the elongated segments is attached to an adjacent elongated segment by an adhesive, and a plurality of elongated reinforcing members for reinforcing the insulation product, wherein the plurality of elongated reinforcing members comprises fiber glass and a resin; and a plurality of securing members for securing the insulation product to the aircraft fuselage, wherein each securing member is capable of engagement with a structural element of the aircraft fuselage.

14. The insulation system of claim 13, wherein the insulation layer is formed from a plurality of sheets of insulation material.

15. The insulation system of claim 13, wherein each elongated segment is in contact with at least one adjacent elongated segment.

16. The insulation system of claim 15, wherein the elongated segments are substantially parallel to each other.

17. The insulation system of claim 15, wherein each elongated reinforcing member is arranged between two adjacent elongated segments.

18. The insulation system of claim 13, wherein the plurality of securing members each comprises a cavity for engagement with a structural member of the aircraft fuselage.

19. The insulation system of claim 13, wherein the series of undulations defines a series of elongated segments of the sheet located between the upper ridges and the lower ridges, wherein each elongated segment is in contact with at least one adjacent elongated segment.

20. The insulation system of claim 13, further comprising at least one upper layer arranged above the insulation layer and/or at least one lower layer arranged below the insulation layer.

21. The insulation system of claim 20, wherein the plurality of elongated reinforcing members is arranged between the insulation layer and the at least one upper layer and/or between the insulation layer and the at least one lower layer.

22. The insulation system of claim 13, wherein the plurality of elongated reinforcing members is in contact with the insulation layer.

* * * * *